United States Patent
Clayton

(10) Patent No.: US 7,278,806 B1
(45) Date of Patent: Oct. 9, 2007

(54) TWO EDGE DEBURRING TOOL

(76) Inventor: Stephen D. Clayton, 5281 57th St. N., Kenneth City, FL (US) 33709

( * ) Notice: Subject to any disclaimer, the term of this patent is extended or adjusted under 35 U.S.C. 154(b) by 0 days.

(21) Appl. No.: 11/457,268

(22) Filed: Jul. 13, 2006

(51) Int. Cl.
*B23C 3/00* (2006.01)
*B23C 5/16* (2006.01)
*B23C 1/00* (2006.01)

(52) U.S. Cl. ............... 409/140; 409/138; 409/132; 407/53; 144/347

(58) Field of Classification Search ............... 409/132, 409/234, 231, 233, 141, 138, 74, 139, 140; 408/156, 154, 229, 230, 21, 59, 119, 144; 29/56.5, 558; 407/31, 34, 35, 53, 48; 144/371, 144/218, 347, 231, 135.2
See application file for complete search history.

(56) References Cited

U.S. PATENT DOCUMENTS

| | | | |
|---|---|---|---|
| 1,014,794 A * | 1/1912 | Weirbach | 144/231 |
| 3,377,890 A * | 4/1968 | Cogsdill | 408/229 |
| 3,442,162 A * | 5/1969 | Cogsdill | 408/156 |
| 3,718,958 A * | 3/1973 | Brucker | 407/48 |
| 3,751,804 A * | 8/1973 | Pulrang | 30/169 |
| 4,147,463 A * | 4/1979 | Robinson | 408/156 |
| 4,504,178 A * | 3/1985 | Seidenfaden | 409/138 |
| 4,505,086 A * | 3/1985 | Hansen | 144/371 |
| 4,589,805 A * | 5/1986 | Duffner | 408/21 |
| 4,820,091 A * | 4/1989 | Koski | 409/132 |
| 4,993,465 A * | 2/1991 | Cotton et al. | 144/371 |
| 5,288,184 A | 2/1994 | Heule | |
| 5,433,563 A | 7/1995 | Velepec | |
| 5,468,100 A | 11/1995 | Naim | |
| 5,615,718 A * | 4/1997 | Venditto | 144/135.2 |
| 5,755,538 A * | 5/1998 | Heule | 408/154 |
| 5,931,616 A * | 8/1999 | Daub | 409/132 |
| 5,944,462 A * | 8/1999 | Woodward | 409/74 |
| 5,996,659 A * | 12/1999 | Burgess | 144/347 |
| 6,007,281 A * | 12/1999 | Eriksson et al. | 409/132 |
| 6,280,126 B1 * | 8/2001 | Slocum et al. | 409/141 |
| 6,343,902 B1 * | 2/2002 | Nishikawa | 409/132 |
| 6,354,347 B1 * | 3/2002 | Brewer | 144/218 |
| 6,367,524 B1 * | 4/2002 | Brewer | 144/371 |
| 6,471,452 B2 * | 10/2002 | Trionfetti | 409/132 |
| 6,773,211 B2 * | 8/2004 | Zackrisson et al. | 409/132 |
| 6,839,953 B2 * | 1/2005 | Fitzgerald et al. | 29/558 |
| 6,840,718 B2 * | 1/2005 | Newmark | 408/119 |
| 6,851,901 B2 * | 2/2005 | Havskog | 409/132 |
| 6,887,017 B2 * | 5/2005 | Klesser | 407/53 |
| 7,150,589 B2 * | 12/2006 | Nordlin | 409/138 |
| 2002/0054799 A1 * | 5/2002 | Anjanappa et al. | 408/230 |
| 2003/0077130 A1 * | 4/2003 | Klesser | 407/53 |
| 2003/0118413 A1 * | 6/2003 | Bruhn et al. | 408/144 |
| 2003/0138301 A1 * | 7/2003 | Kuerzel | 407/34 |
| 2003/0215295 A1 * | 11/2003 | Gaiser et al. | 408/59 |
| 2005/0000072 A1 * | 1/2005 | Wolff et al. | 29/56.5 |
| 2005/0084353 A1 * | 4/2005 | Hecht | 408/231 |
| 2005/0089383 A1 * | 4/2005 | Nordlin | 409/234 |
| 2005/0095072 A1 * | 5/2005 | Gaiser et al. | 408/59 |

\* cited by examiner

*Primary Examiner*—Dana Ross
(74) *Attorney, Agent, or Firm*—Larson and Larson; Frank Liebenow

(57) ABSTRACT

A rotating tool for simultaneously deburring two surfaces of a workpiece is disclosed including a rotatable shaft having a first end and a second end with a first deburr surface on the first end facing towards the second end and having a first angle. A second deburr surface is formed between the first end and the second end facing towards the first end and having a second angle. The distance between a first mid-point of the first deburr surface and a second mid-point of the second deburr surface is substantially equal to a width of the workpiece.

20 Claims, 2 Drawing Sheets

TWO EDGE DEBURRING TOOL

BACKGROUND OF THE INVENTION

1. Field of the Invention

This invention relates to the field of deburring and more particularly to a device for deburring two edges of a workpiece.

2. Description of the Related Art

Deburring tools are well known in the industry. When a metal object or workpiece is cut or bored, metal fragments called burrs occur on its edges. These burrs have many associated issues including: they detract from the aesthetic look of the finished product; they form a sharp edge that can cause cuts and scrapes; and, when they eventually break off, they can cause electrical shorts or they can cause other failures to mechanisms such as gears and bearings. Burrs are removed in several ways including from passing a drill bit along one of the edges or filing. In addition, a deburring tool sometimes chamfers the edges of the workpiece.

Presently, in an automated machine tool process, a drill bit or end mill is used to deburr one edge of a workpiece after cutting or boring. The automated machine tool is programmed to traverses the rough edges on the top of the work piece with the drill bit or end mile, removing burrs and metal fragments. This process works fine for a top edge, but the workpiece must be reoriented to deburr the bottom edge, requiring an extra operator intervention. The added operator intervention greatly reduces the efficiency of the automated machine tool operation.

Several solutions to this problem have been developed in the past. U.S. Pat. No. 5,288,184 to Heule describes a cutting tool that also has a deburr feature. This tool has one or more cutting knives affixed to a tool. The tool described requires separate operations, one for cutting the bore, one for deburring a first edge of the bore and another for deburring a second edge of the bore.

Another tool is described in U.S. Pat. No. 5,468,100 to Naim. This tool has opposing cutting edges but is not designed to operate at high speeds, as required when the workpiece material is steel. Furthermore, the described tool is adjustable, making it difficult to obtain an accurate setting of the cutting surfaces in relationship to the width of the workpiece.

What is needed is a deburr tool that will accurately deburr and/or chamfer two surfaces of a workpiece simultaneously.

SUMMARY OF THE INVENTION

In one embodiment, a rotating tool for simultaneously deburring two surfaces of a workpiece is disclosed including a rotatable shaft having a first end and a second end with a first deburr surface on the first end facing towards the second end and having a first angle. A second deburr surface is formed between the first end and the second end facing towards the first end and having a second angle. The distance between a first mid-point of the first deburr surface and a second mid-point of the second deburr surface is substantially equal to the width of the workpiece.

In another embodiment, a method of simultaneously deburring two surfaces of a workpiece is disclosed, the workpiece has a width. The method includes providing a rotating tool for simultaneously deburring two surfaces of a workpiece, the tool includes a rotatable shaft having a first end and a second end with a first deburr surface formed on the first end facing towards the second end and having a first angle. A second deburr surface is formed between the first end and the second end facing towards the first end having a second angle. The distance between a first mid-point of the first deburr surface and a second mid-point of the second deburr surface is substantially equal to the width of the workpiece. The method continues with rotating the tool and simultaneously contacting a top edge of the work piece with the first deburr surface and contacting a bottom edge of the work piece with the second deburr surface, thereby simultaneously removing burrs from the top edge of the workpiece and the bottom edge of the workpiece.

In another embodiment, a rotating tool for simultaneously deburring two surfaces of a workpiece is disclosed including a rotatable shaft with a first end and a second end. A first deburr edge is situated on the first end, facing towards the second end and having a first angle. A second deburr edge is situated between the first end and the second end, facing towards the first end having a second angle. The distance between a first mid-point of the first deburr edge and a second mid-point of the second deburr edge is substantially equal to a width of the workpiece.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
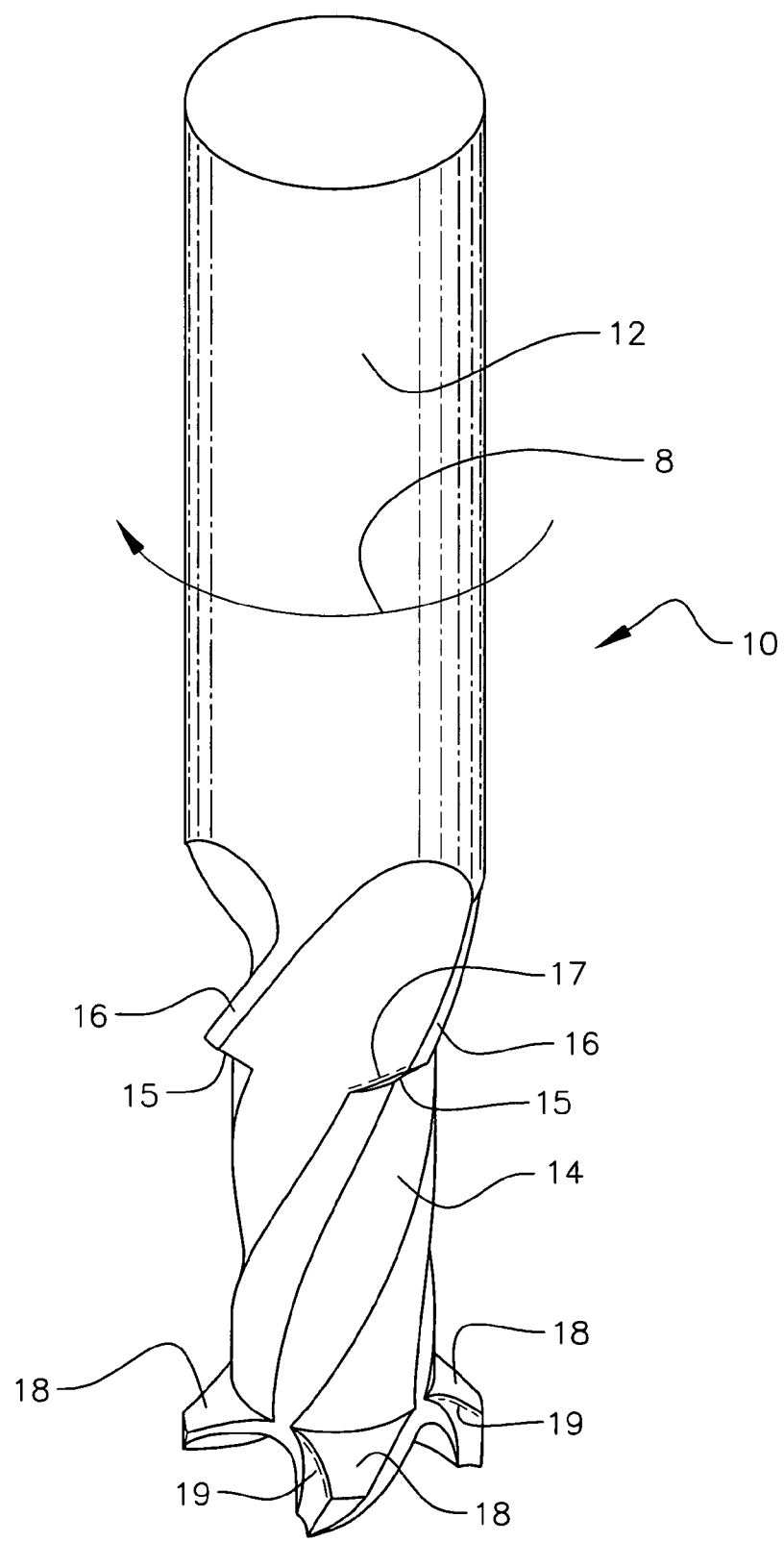
FIG. 1 illustrates a deburr tool of a first embodiment of the present invention.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a deburr tool of a first embodiment of the present invention is shown. The deburr tool 10 is fabricated from a mill end or drill bit, either having straight flutes or spiral flutes. The shaft 12 of the deburr tool 10 is intended for insertion into a source of rotation such as a high-speed milling machine or computer aided manufacturing system. In one embodiment, the deburr tool 10 is configured to rotate in one direction 8, but in an alternate embodiment, a deburr tool 10 is configured to rotate in the opposite direction. It is preferred that the deburr tool 10 be made from hardened steel or carbide steel to withstand repeated high-speed operations.

The deburr tool 10 is constructed similar to an end mill. The number of flutes or cutting edges 16 can be any number greater than or equal to one and usually relates to the type of stock being deburred and the amount of material being removed. For example, for a 2-flute deburr tool 10 is used for chamfering aluminum stock and a 3-flute deburr tool 10 is used for lighter finishes. The spiral or helix flute is at any angle from zero (straight flutes) to just less than 90 degrees, but it is preferred to be 35 degrees, 45 degrees or 60 degrees. In some embodiments, the cutting edges of the flute are diamond coated.

Figure 2:
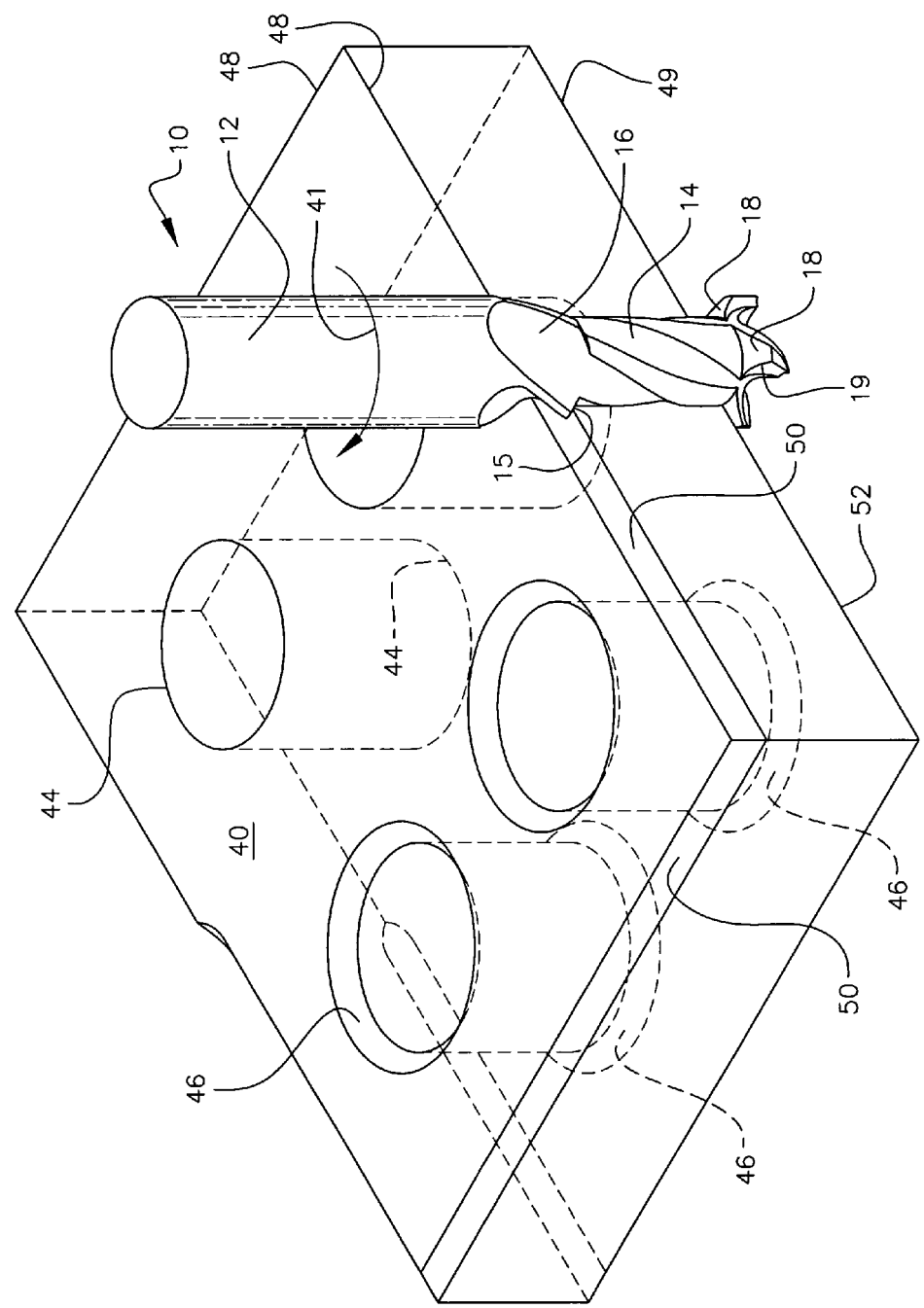
FIG. 2 illustrates a deburr tool of the first embodiment of the present invention in operation.

The deburr tool 10 has two generally symmetrical opposing sets of deburr surfaces 15/18 for making simultaneous contact with the top edge and bottom edge of the workpiece 40 (see FIG. 2). Note that a set of deburr surfaces includes one pair of deburr surfaces. Each of the deburr surfaces 15/18 has a cutting edge 17/19. The distance between each of the deburr surfaces 15/18 is approximately equal to the width of the workpiece 40 so that the first set of deburr surfaces 15 contacts a top edge of the workpiece 40 while the second set of deburr surfaces 18 contacts a bottom edge of the workpiece 40, thereby removing burrs and/or chamfering both edges of the workpiece 40 during the same operation. It is preferred that the distance from a mid-point of the top deburr surfaces 15 to the mid-point of the opposing bottom deburr surfaces 18 be approximately the width of the workpiece 40 such that the edges of the workpiece 40 contact the deburr tool 10 at approximately the middle of the deburring surfaces 15/18. Notwithstanding, the deburr tool 10 of the present invention functions as intended as long as the opposing deburr surfaces 15/18 are spaced apart such that the distance between the outer edge of the opposing deburr surfaces 15/18 is greater than the width of the workpiece 40 and the distance between the inner edge of the opposing deburr surfaces 15/18 is less than the width of the workpiece 40.

In one embodiment, the deburr tool 10 is formed by cutting out a portion 14 of an existing tool such as a mill end, leaving the two sets of deburr surfaces 15/18. A partial helix or spiral 14 from the initial tool (mill end) is shown, though in some embodiments, the mill end is cut deep enough as to eliminate the helix or spiral 14. The original flutes 16 are shown with their original cutting edges 17 and these edges can still be used for their original milling purposes. Furthermore, the end of the mill end retains its original cutting edges and can still be used as a mill end. It is preferred that the sets of opposing deburr surfaces 15/18 are formed at an angle that is typically 45 degrees with reference to the axis of rotation so as to chamfer the workpiece's 40 edges at a 45 degree angle. Alternately, the opposing deburr surfaces 15/18 can be formed at any desired angle and can be of a straight edge or can be curved to produce a finished edge on the workpiece 40 that has a radius.

Referring to FIG. 2, a deburr tool of the first embodiment of the present invention in operation is shown. In this drawing, an exemplary workpiece 40 is shown having four holes bored into it. The deburr tool 10 has a shaft 12 that is coupled to a source of rotation (not shown). The source of rotation has x-axis and y-axis directional movement and moves the deburr tool 10 along the edges of the workpiece 40 to deburr the edges of the workpiece 40. The deburr tool 10 is shown in contact with an outside set of edges of the workpiece 40, having completed deburring of the upper edge 50 and the lower edge 52 the deburr tool 10 is moved along the edges 48/49 to complete the deburr operation on that side of the workpiece. Also shown are two bores with edges 44 that have not been deburred and two bores with edges 46 that have already been deburred.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A one-piece, high-speed rotating tool for simultaneously deburring two surfaces of a metal workpiece, the tool comprising:
   a rotatable shaft having a first end and a second end;
   a first deburr surface on the first end, facing towards the second end and having a first angle; and
   a second deburr surface formed between the first end and the second end, facing towards the first end having a second angle;
   whereby the distance between a first mid-point of the first deburr surface and a second mid-point of the second deburr surface is substantially equal to a width of the workpiece.

2. The one-piece, high-speed rotating tool of claim 1, wherein the first angle and the second angle are approximately the same angle.

3. The one-piece, high-speed rotating tool of claim 1, wherein the first angle and the second angle are approximately 45 degrees with respect to an axis of rotation of the rotatable shaft.

4. The one-piece, high-speed rotating tool of claim 1, wherein the second end is adapted to interface with a source of rotational energy.

5. The one-piece, high-speed rotating tool of claim 1, wherein the first end includes a mill end tool.

6. The one-piece, high-speed rotating tool of claim 1, wherein the first end includes a drill.

7. The one-piece, high speed rotating tool of claim 1, wherein the rotating tool is made from carbide steel.

8. A method of simultaneously deburring two surfaces of a metal workpiece, the method comprising:
   providing the metal workpiece having a width;
   providing a one-piece, high-speed rotating tool for simultaneously deburring two surfaces of the metal workpiece, the one-piece, high-speed rotating tool comprising:
      a rotatable shaft having a first end and a second end;
      a first deburr surface formed on the first end, facing towards the second end and having a first angle; and
      a second deburr surface formed between the first end and the second end, facing towards the first end having a second angle;
      whereby the distance between a first mid-point of the first deburr surface and a second mid-point of the second deburr surface is substantially equal to the width of the workpiece;
   rotating the one-piece, high-speed rotating tool;
   simultaneously contacting a top edge of the metal workpiece with the first deburr surface and contacting a bottom edge of the metal workpiece with the second deburr surface, thereby simultaneously removing burrs from the top edge of the metal workpiece and the bottom edge of the metal workpiece.

9. The method of claim 8, wherein the first angle and the second angle are approximately the same angle.

10. The method of claim 8, wherein the first angle and the second angle are approximately 45 degrees with respect to an axis of rotation of the rotatable shaft.

11. The method of claim 8, wherein the second end is adapted to interface with a source of rotational energy.

12. The method of claim 8, wherein the top edge of the metal workpiece and the bottom edge of the workpiece are outside edges of the workpiece.

13. The method of claim 8, wherein the top edge of the metal workpiece and the bottom edge of the metal workpiece are edges of a bore in the workpiece.

14. A one-piece, high-speed rotating tool for simultaneously deburring two surfaces of a metal workpiece, the one-piece, high-speed rotating tool comprising:
  a rotatable shaft having a first end and a second end;
  a first means for deburring on the first end, facing towards the second end and having a first angle; and
  a second means for deburring formed between the first end and the second end, facing towards the first end having a second angle;
  whereby the distance between a first mid-point of the first means for deburring and a second mid-point of the second means for deburring is substantially equal to a width of the metal workpiece.

15. The one-piece, high-speed rotating tool of claim 14, wherein the first angle and the second angle are approximately the same angle.

16. The one-piece, high-speed rotating tool of claim 14, wherein the first angle and the second angle are approximately 45 degrees with respect to an axis of rotation of the rotatable shaft.

17. The one-piece, high-speed rotating tool of claim 14, wherein the second end is adapted to interface with a source of rotational energy.

18. The one-piece, high-speed rotating tool of claim 14, wherein the first end includes a mill end tool.

19. The one-piece, high-speed rotating tool of claim 14, wherein the first end includes a drill.

20. The one-piece, high-speed rotating tool of claim 14, wherein the one-piece, high-speed rotating tool is made from carbide steel.

* * * * *